TAPE RECORDER

Filed March 7, 1956 6 Sheets-Sheet 1

INVENTOR.
Jay C. Fonda,
BY Paul & Paul
ATTORNEYS.

Oct. 13, 1959 | J. C. FONDA | 2,908,769

TAPE RECORDER

Filed March 7, 1956 | 6 Sheets-Sheet 2

INVENTOR.
Jay C. Fonda,
BY Paul & Paul
ATTORNEYS.

Oct. 13, 1959 J. C. FONDA 2,908,769

TAPE RECORDER

Filed March 7, 1956 6 Sheets-Sheet 3

INVENTOR.
Jay C. Fonda,
BY Paul & Paul
ATTORNEYS.

Oct. 13, 1959 J. C. FONDA 2,908,769

TAPE RECORDER

Filed March 7, 1956 6 Sheets-Sheet 4

INVENTOR.
Jay C. Fonda,
BY Paul & Paul
ATTORNEYS

INVENTOR.
Jay C. Fonda,
BY Paul & Paul
ATTORNEYS

Oct. 13, 1959 J. C. FONDA 2,908,769

TAPE RECORDER

Filed March 7, 1956 6 Sheets-Sheet 6

INVENTOR.
Jay C. Fonda,
BY Paul & Paul

United States Patent Office 2,908,769

Patented Oct. 13, 1959

2,908,769

TAPE RECORDER

Jay C. Fonda, Narberth, Pa., assignor to Le Roy H. Keeler, Ralph W. Shaw, Jay C. Fonda, Radley Cross, Richard E. Messmer, and John F. Donohue, Philadelphia, Pa.

Application March 7, 1956, Serial No. 570,180

18 Claims. (Cl. 179—100.2)

This invention relates to tape recorders and more particularly to magnetic tape recorders primarily used for commercial recording and reproducing where it is desirable to record or reproduce for relatively long periods of time and to be able to record and reproduce simultaneously on the same section of tape.

It is a purpose of this invention to provide an improved tape recorder suitable for use with an endless roll of magnetic tape.

It is also a purpose of this invention to provide an improved tape recorder suitable for use with tapes of exceptionally great width.

It is a further purpose of this invention to provide an improved tape recorder capable of recording and reproducing on successive separate tracks on an endless magnetic tape.

It is also an object of this invention to provide a tape recorder having recording or reproducing heads which can be easily moved manually to any desired widthwise position on the tape.

It is another purpose of this invention to provide a tape recorder for recording or reproducing on successive tracks of tape which will stop automatically when the full width of tape has been played.

It is still a further purpose of the invention to provide a tape recorder capable of either recording or reproducing on separate tracks of a tape which will stop automatically when either recording or reproducing head has played the entire width of tape.

It is another object of the invention to provide a tape recorder which delivers the tape with a minimum amount of tension on the tape to the recording or reproducing heads.

It is another object of the invention to provide a wide tape storage and delivery magazine for a tape recorder capable of continuous delivery of a wide tape under no tension to recording and reproducing heads.

It is another object of the invention to provide accurate indicators for a wide tape endless tape recorder, which indicate the elapsed playing time, the widthwise track being played by either recording or indicating head and when the complete tape has been played.

Many other objects and advantages of the invention will be apparent from the following description of a specific embodiment of the invention and the drawings of which:

Figure 1:
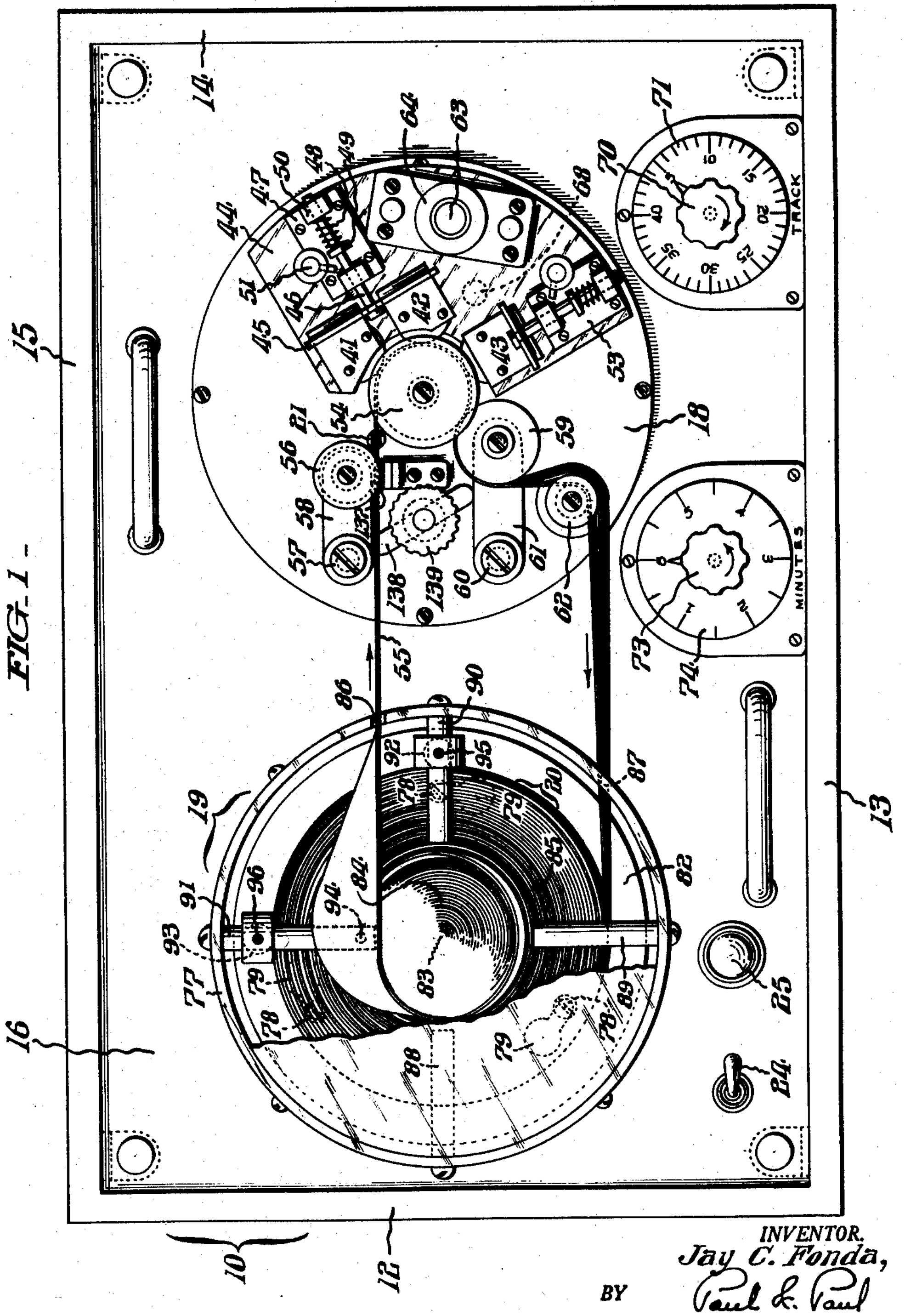
Fig. 1 is a plan view of a tape recorder made in accordance with the invention.
Figure 2:
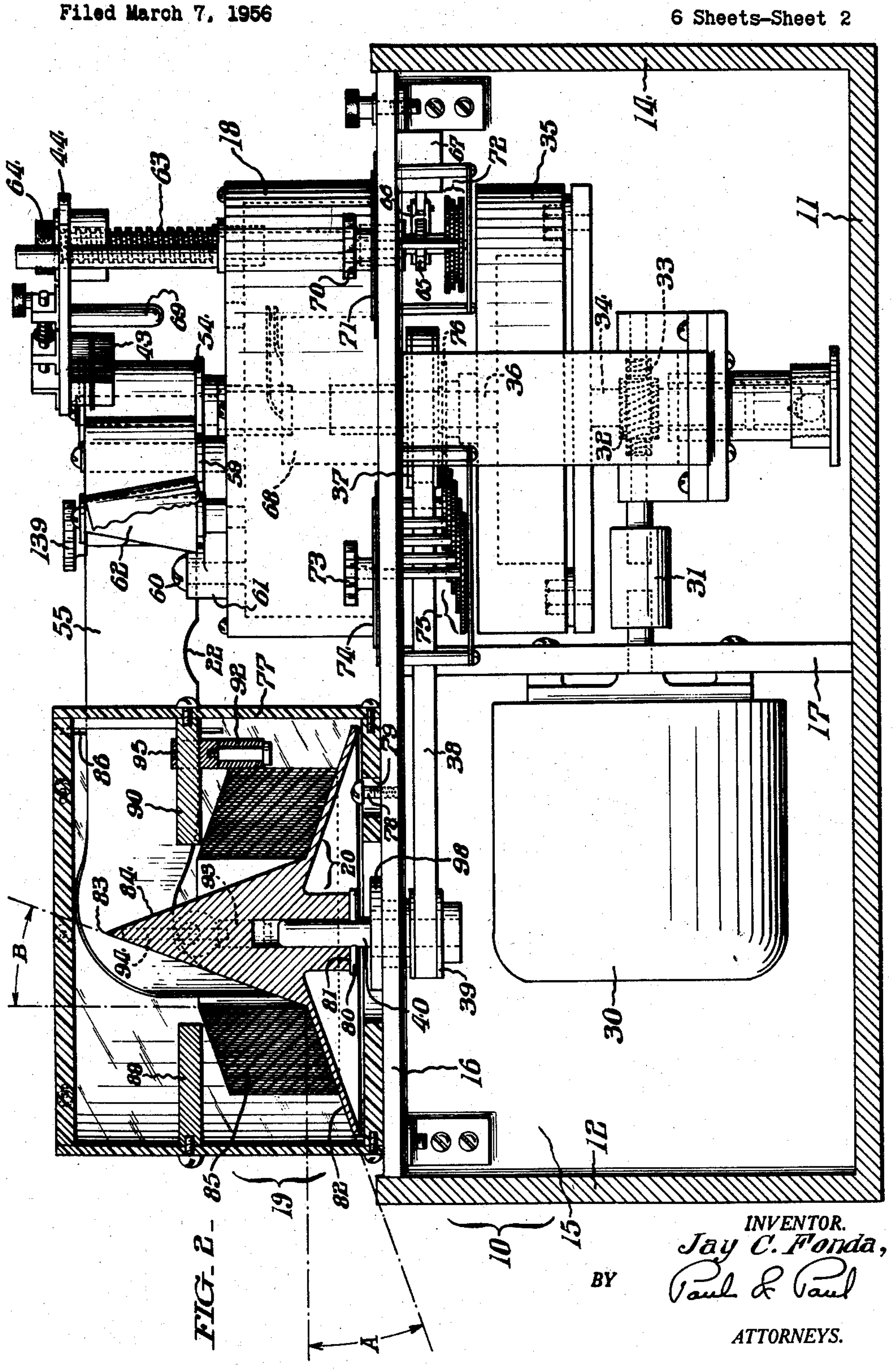
Fig. 2 is a front elevation partly in cross section and partly broken away of the tape recorder shown in Fig. 1.

The tape recorder shown in Figs. 1 and 2 is mounted in the case 10 having base 11 and sides 12, 13, 14 and 15. The platform 16 is mounted in the case 10 at a vertical level to provide room beneath for driving means for the recorder. Vertical partition 17 is disposed between base 11 and platform 16. The recording and reproducing means are mounted on the playing platform 18. The tape magazine 19 is fixed directly to the platform 16. The turntable 20 of the tape magazine 19 is driven by the motor 30 through rubber coupling 31, worm gear 32, pinion 33 mounted on shaft 34, flywheel 35, vertical shaft 36, pulley 37, drive-belt 38, pulley 39 and drive-shaft 40. Shaft 36 extends upwards to drive capstan 54.

The erasing head 41, recording head 42 and reproducing head 43 are mounted on the movable table 44. The erasing head 41 and recording head 42 are connected by the bracket 45. These heads may be withdrawn from playing position by the rod 46 which is connected at one end to bracket 45 and at the other end is slidably mounted in the bracket 47. The spring 48, mounted on rod 46 and abutting flange 49 and bearing 50 urges the erasing and recording heads 41 and 42 into playing position. The detent pin 51 may be rotated to retract the flange 49 and rod 46 to withdraw the erasing and recording heads 41 and 42 from playing position. Reproducing head 43 is similarly mounted in bracket 53. Flanged capstan 54 is centrally mounted on the playing platform 18 and extends vertically upward adjacent the table 44. The capstan 54 carries the tape 55 as it passes the playing heads 41, 42 and 43. Movable idler 56 is located on one side of capstan 54 and is urged against the tape 55 to keep it smooth as it passes the playing heads. Idler 56 is pivotally connected to stationary pin 57 by bracket 58. A second movable idler 59 is located on the other side of capstan 54 and in operation is separated from it only by the tape 55. Idler 59 is pivotally connected to stationary pin 60 by bracket 61. A stationary idler 62 is spaced from movable idler 59 and is tapered upwardly to provide a graduated change in the position of the tape 55 as it leaves the playing platform 18. The movable table 44 is threadably mounted on the vertical threaded rod 63. The rod 63 may be rotated manually by the knurled knob 64 or automatically by the ratchet 65, pawl 66 and solenoid 67. The solenoid 67 is actuated by the track switch 21 which closes when a complete track on the tape 55 has been played. The switch 21 closes when the notch 22 passes over it. The notch 22 is therefore located in the tape 55 at the end of the track. Limit switch 68 is positioned inside the playing platform 18. This switch is actuated by the actuating pin 69 when the full width of the tape 55 has been played. The position of the table 44 along the width of the tape 55 is indicated by the track indicator 70 on the dial 71. Indicator 70 is actuated by the gear train 72 in response to the rotation of the rod 63.

The elapsed playing time is indicated by the time indicator 73 on dial 74. Indicator 73 is actuated by gear train 75 in response to the rotation of pinion 76 on the vertical shaft 36.

The tape magazine 19 has a housing 77 which is cylindrical in shape and is removably attached to the platform 16 by the bolts 78 in the slots 79. An enlarged space is provided in the bottom of the housing for the base of turntable 20. The turntable 20 is rotatably mounted in the housing 77 and is fixed to the drive shaft 40 by means of the pin 80 riding in the engaging slot 81. The face 82 of turntable 20 tapers upwardly toward the center and as it approaches the center it rises abruptly to the point 83 forming the conical surface 84. The tape roll 85 rides on face 82 and is thus tapered upwardly toward its center. The tape 55 emerges from the roll 85 along the conical surface 84 and passes through exit guide slot 86 and thence to the playing platform 18. The tape 55 returns from playing platform 18 to the magazine 19 and enters the entering guide slot 87 and is taken up on the roll 85. Horizontal guide pins 88, 89, 90 and 91 are affixed to the housing 77 and extend inwardly over the tape roll 85 to retain it in place on the turntable face 82. Vertical guide rollers 92 and 93 are mounted on guide pins 90 and 91 respectively to center the roll 85 about the cone 84. The rollers are fixed on the guide pins 90 and 91 by set screws 95 and 96 respectively, and may be adjusted for varying diameters of the roll 85. Vertical guide pin 94 is mounted near the inward end of horizontal guide pin 91 to control the flow of tape from the conical surface 84 to the exit slot 86. Guide pin 94 extends above and below horizontal pin 91. The lower portion keeps the inner part of tape roll 85 from pressing on conical surface 84 so that the tape 55 does not rub on the cone 84 as it leaves the roll 85. The upper part of pin 94 guides the tape 55 to the exit slot 86. In addition to their functions during operation of the magazine 19, the guide pins and roller serve to hold the tape roll 85 in position in the magazine 19 during removal from the recorder and storing.

Figures 14, 15:
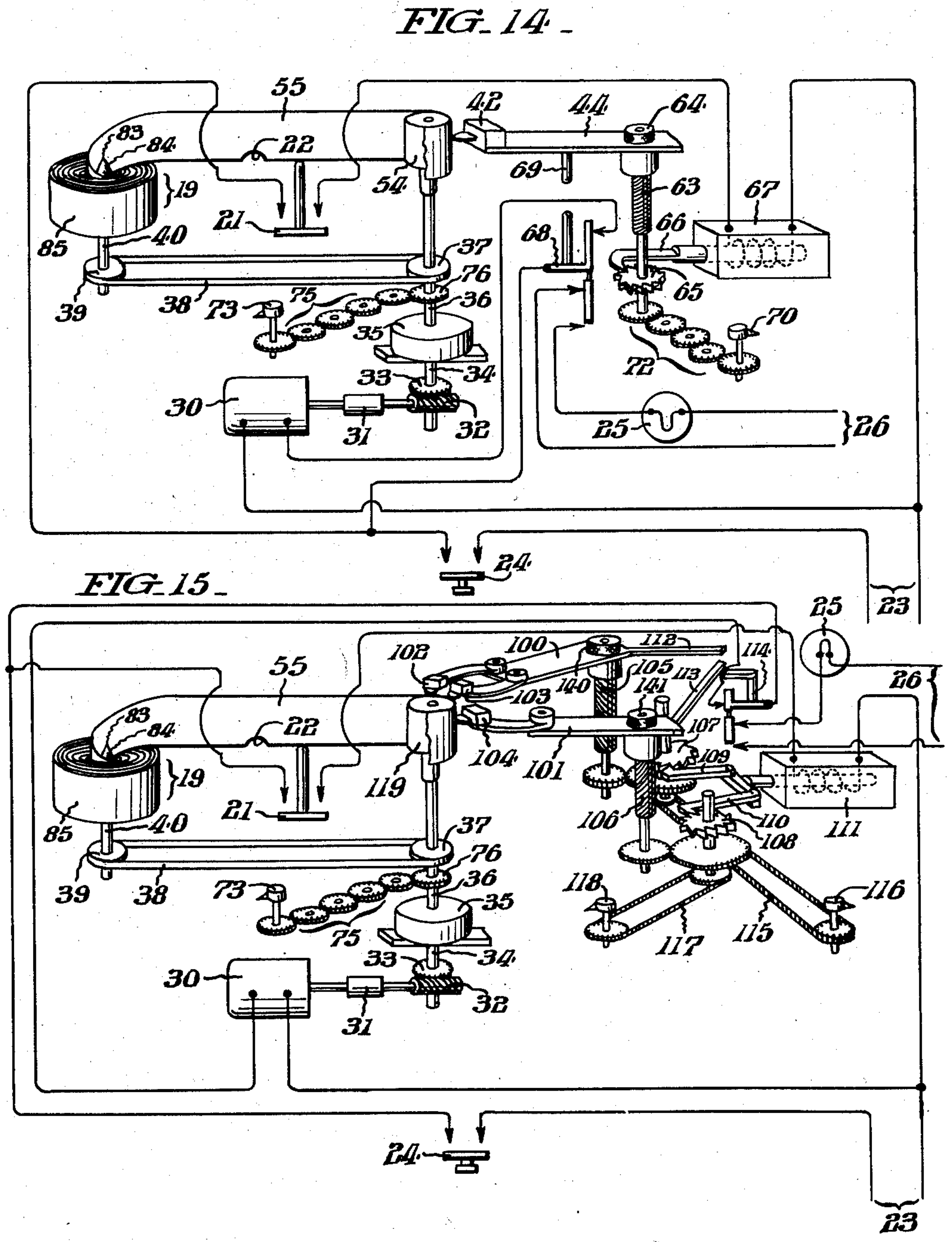
Fig. 14 is a schematic diagram of the embodiment of the invention shown in Figs. 1 and 2.
Fig. 15 is a schematic diagram of the embodiment of the invention shown in Figs. 7 and 8.

The operation of the tape recorder shown in Figs. 1 and 2 is illustrated schematically in Fig. 14. The recorder is connected to a power source 23 through switch 24. When the switch 24 is closed the motor 30 is energized, driving the worm gear 32 through rubber coupling 31. The worm gear 32 drives pinion 33 mounted on shaft 34, thereby rotating shaft 36 through flywheel 35. The shaft 36 drives the time-indicator gear train 75 and the pulley 37 and belt 38. The gear train 75 is constructed to record the number of elapsed minutes of driving or playing time on the dial 74. Since the motor 30 runs at a definite number of revolutions per minute, the elapsed time can be translated to the dial by recording the number of revolutions of the shaft 36 through the gear train 75. The belt 38 drives vertical drive shaft 40 through pulley 39 and thereby causes the tape 55 to be delivered positively to the recording head 42 from the tape roll 85 by the tape magazine 19. The recording head 42 is shown for purposes of illustration, and it will be understood that any of the three heads, 41, 42, 43, or all of them could be used. The head 42 is placed initially at the top widthwise position on the tape 55 and records along a definite linear track throughout the length of the tape. The notch 22 is placed just ahead of the beginning recorded portion and thus represents the end of the recorded or reproduced track. When the notch 22 reaches the switch 21, the switch rises and closes the circuit to the solenoid 67. The actuation of the solenoid 67 pulls the pawl 66, thereby rotating the ratchet 65 and shaft 63. The rotation of threaded shaft 63 causes the table 44 to move vertically downward. This is accomplished by fixing the threads of the platform 44 and rod 63 to move the recording head 42 down to the next successive recording track on the tape 55. When the head 42 has traveled downward over the complete width of tape 55 the pin 69 opens switch 68 thereby opening the circuit to the motor 30 and stopping rotation of the roll 85. A separate circuit including light indicator 25 is powered from source 26. The indicator circuit includes switch 68, and the switch is positioned to close the circuit just prior to playing the last track on tape 55. Thus the indicator 25 is lit up before the motor circuit is opened. As the threaded rod 63 rotates to lower the table 44 it also actuates gear train 72 and then track indicator 70. The indicator 70 is calibrated to register successive recording or reproducing tracks on dial 71. The rod 63 may also be rotated manually at any time by means of the knurled knob 64.

The tape storing and delivering structure is shown in detail in Figs. 3–6. A tape magazine has been constructed according to the invention to accommodate two hundred and forty feet of magnetic tape as wide as one and one-half inches. It has been found that Du Pont "Mylar" tape, .003 inch thick and one and one-half inches wide, is satisfactory for this purpose. The turntable 20 is constructed to provide consistent positive delivery of tape at a uniform linear rate of speed past the playing heads. None of the guide rollers 56, 59 and 62 on the playing platform 18 is driven. The source of driving power for the tape 55 is the turntable 20. The capstan 54 serves only to meter the tape 55 past the playing heads. The tape is isolated from outside tensions on either side of capstan 54 by the idler rollers 56 and 59. The tape 55 is therefore pushed out of the magazine 19 to the playing heads, insuring no tension on the tape 55, and pulled back to magazine 19 by the rotation of roll 85 on the turntable 20. The roll 85 is loosely disposed on the turntable 20 due to the slope of face 82 and the centrifugal force from rotation. The pull on the returning tape 55 is therefore not rigid, but is free and flexible. Any variations in the delivery rate are easily absorbed by the roll 85 without placing strain on the tape 55. Since the linear speed of the tape 55 through the playing heads and in roll 85 must be substantially uniform and since the turntable 20 rotates at a uniform rate, there is necessarily some slippage between the tape roll 85 and turntable face 82. This slippage is of fundamental importance in the successful operation of the recorder. Since the outside of face 82 is going at a faster linear rate than the inside at the base of cone 84 the tape in the roll 85 tends to slow down in linear speed as it approaches cone 84. This prevents tension on the tape in roll 85. If any tension is put on the tape as it enters the magazine 19 through slot 87, the tension is taken up in the roll itself which is able to contract and expand as it rotates. The centrifugal force acting on roll 85 due to its rotation and the slope of face 82 tends to separate the tape in the roll providing room for contraction. The conical surface 84 serves to peel the tape 55 out of the inner portion of the roll 85 giving it a vertical force component and at the same time delivering the tape through the exit slot 86 in a vertical position without twist or distortion.

It has been found that the tape 55 tends to "climb" the conical surface 82 in a substantially vertical position.

Figure 7:
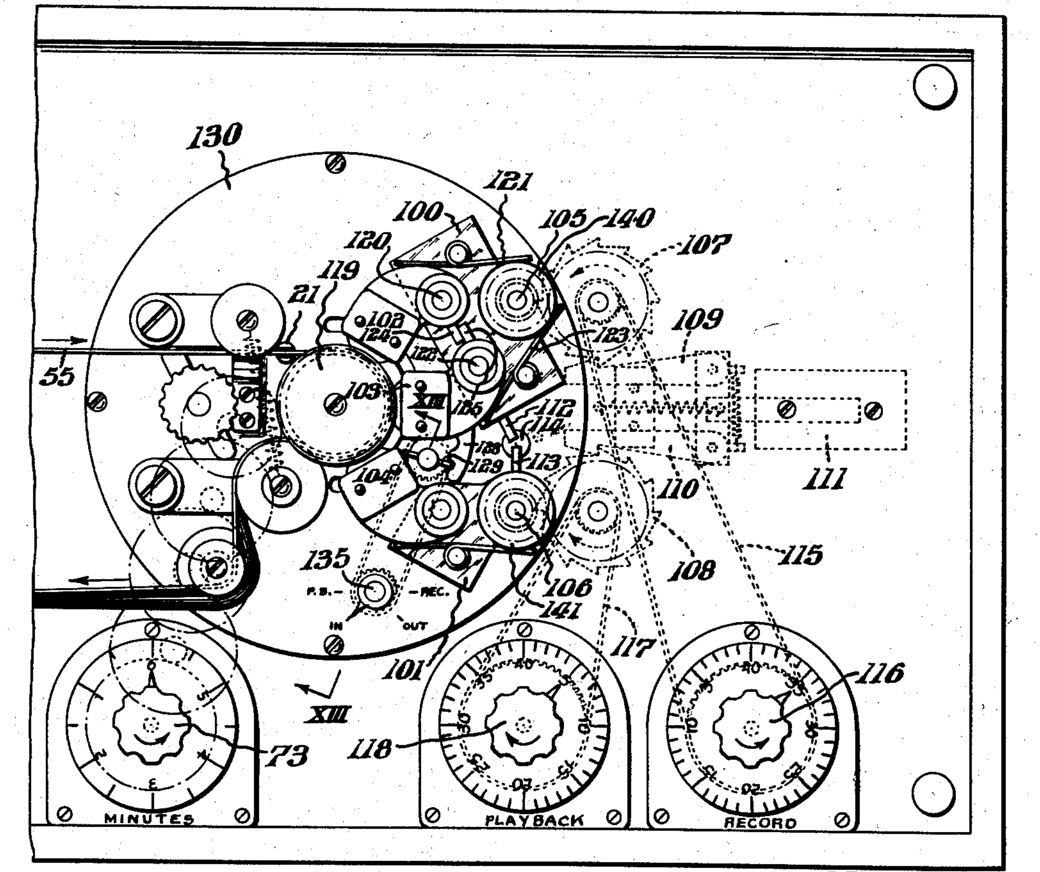
Fig. 7 is a plan view of another specific embodiment of the invention similar to the right half of Fig. 1.
Figures 8, 12, 13:
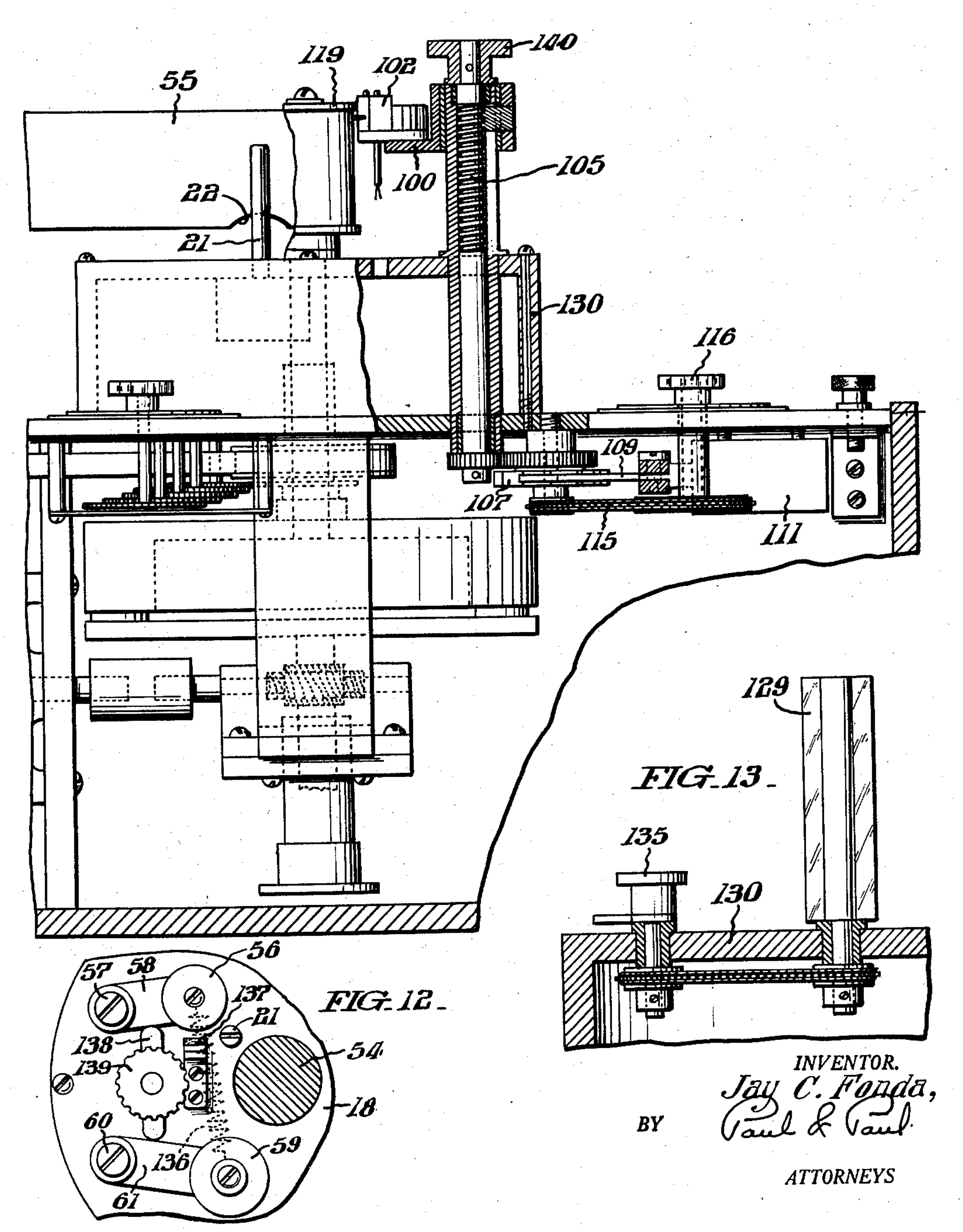
Fig. 8 is a front elevation partly in cross section and partly broken away of Fig. 7.
Fig. 12 is a detailed plan view of the idler rollers of Figs. 1 and 7 to illustrate the operation thereof.
Fig. 13 is a view along the line XIII—XIII of Fig. 7.

An alternative embodiment of the invention is shown in Figs. 7 and 8. In this embodiment the recording and reproducing heads are mounted on separate tables 100 and 101. Erasing head 102 and recording head 103 are fixed to table 100. Reproducing head 104 is fixed to table 101. Tables 100 and 101 are movably mounted on rotatable threaded rods 105 and 106, respectively, for vertical movement upon rotation of the rods. The operation of the tables on the rods in this respect is similar to the operation of table 44 on rod 63 in Figs. 1 and 2. Here, however, the rods have separate ratchet 107 and 108 actuated pawls 109 and 110 which are worked in common by the solenoid 111 when the notch 22 in tape 55 actuates switch 21. Each of the tables has an actuating pin 112 and 113, respectively, for opening the limit switch 114 which shuts off the motor 30. It is thus possible to play or record on successive separate tracks of the tape 55 at the same time. Ratchet wheel 107, actuated by threaded rod 105, is operatively connected by bead chain 115 to recording track indicator 116 which indicates the track being recorded upon by recording head 103. Likewise, ratchet 108 is connected by bead chain 117 to reproducing track indicator 118 which indicates the track being played by reproducing head 104.

Figures 9, 10, 11:
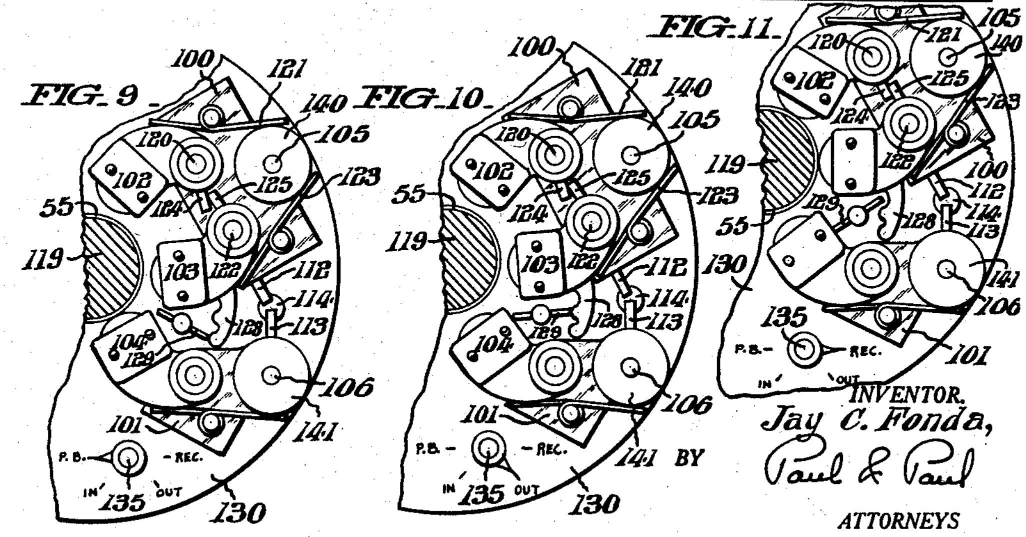
Figs. 9, 10 and 11 are detailed plan views of recording and reproducing head actuating means of Fig. 7 to illustrate the operation thereof.

Figs. 9–11 illustrate the means provided for selectively moving the playing heads toward and away from the capstan 119. Erasing head 102 is pivotally connected to table 100 by the pin 120. Spring 121 urges the head 102 toward the capstan 119. Recording head 103 is also pivotally connected to table 100 by pin 122 and urged toward capstan 119 by spring 123. Pin 124 is affixed to erasing head 102, rotates with it about pin 120 and extends toward recording head 103. Pin 125 is similarly affixed to recording head 103 and extends toward erasing head 102. Pin 125 is positioned adjacent pin 124 so that any counter-clockwise rotation of recording head 103 effects head 102 clockwise. In this position of Fig. 9 the recorder is playing from the tape 55 but is not recording. In Fig. 10 one end of the blade 129 forces the reproducing head 104 away from the capstan 119 while the other end raises template 128 to withdraw both erasing and recording heads 102 and 103. In Fig. 11 the blade 129 is in a recessed position of template 128 permitting both erasing and recording heads 102 and 103 to function while the opposite end of the blade 129 forces reproducing head 104 away from the capstan 119. It will then be apparent that by rotating the indicator 135 the heads can be made to withdraw or play simultaneously or separately, with each position indicated on the platform 130 by indicator 135.

Fig. 12 shows in detail the operation of the movable idlers 56 and 59 which serve to maintain tape 55 in a smooth condition under even tension as it travels about capstan 54. Rollers 56 and 59 are connected and urged toward each other by the spring 136. The inward movement of roller 56 is fixed by the pressure pad 137 and roller 59 abuts the capstan 54. The pressure pad 137 is made of felt, and it serves several important purposes. It maintains the tape in a smooth condition as indicated above and isolates the tape around the capstan 54 from outside tensions. It also tends to clean and polish the tape 55 just prior to entering the playing heads. The felt pad is renewable. When it is desired to remove the tape 55 from the capstan 54 the rollers are backed off by means of separating bar 138 which is rotated by knob 139.

The operation of the alternative embodiment of the invention shown in Figs. 7 and 8 is illustrated schematically in Fig. 15. The driving mechanism, tape magazine and time indicating structure are similar to those of Fig. 14. However, the erasing and recording heads 102 and 103 are mounted separately from reproducing head 104. By rotating the knurled knobs 140 and 141 independently, the recorder can be adjusted to play and record simultaneously on separate tracks on the same tape. The tape 55 passes the playing heads until notch 22 closes switch 21 thereby lowering the playing heads to the next successive track simultaneously through solenoid 111. When either of the playing heads reach the bottom of the tape, one of the pins 112 and 113 open switch 114 and shut off the driving motor 30 and light the light indicator 25. The playing heads may then be reset vertically by means of the knurled knobs 140 and 141 and the driving means re-started.

It has been determined from repeated experiments that certain dimensions of the turntable 20 give best tape delivering results under normal operating conditions. Basically, it is desirable to have a thin tape rather than a thick one to provide more playing length in a roll of given diameter. It is desirable to use a wide tape to allow for greater playing time in a fixed length of tape. However, a wide tape is more difficult to handle in a continuous belt than a narrow one, and a thin tape is more difficult than a thick one. It is also desirable to use a tape roll of as small a diameter as possible due to space limitations in some recorders. Accordingly, it has been determined that a turntable made according to the invention to accommodate a tape two hundred and forty feet in length, one and one-half inches wide and two thousandths of an inch thick may be used to deliver a tape at a linear rate of 8 in./sec. where the diameter of turntable 20 is five and one-half inches, the angle "A" is seventeen degrees, the base of the conical surface 82 is two inches in diameter and the angle "B" is nineteen degrees to the point 83. The face 82 of the turntable 20 and conical surface 84 are finished by polishing to a finish of at least eight to ten micro-inches to insure slipping of the tape roll 85 on face 82. It will be understood that the above dimensions are given only by way of example and that considerable variation may occur in the dimensions given to achieve a satisfactory result depending upon the parameters of speed and width, thickness and length of tape. It has also been determined that it is preferable to maintain the change in slope from turntable face 82 to conical surface 84 as a sharp angle as is shown rather than as a smooth, gradual change. The sudden change in slope appears to avoid curling of the tape 55 about conical surface 84.

Figures 3, 4, 5, 6:
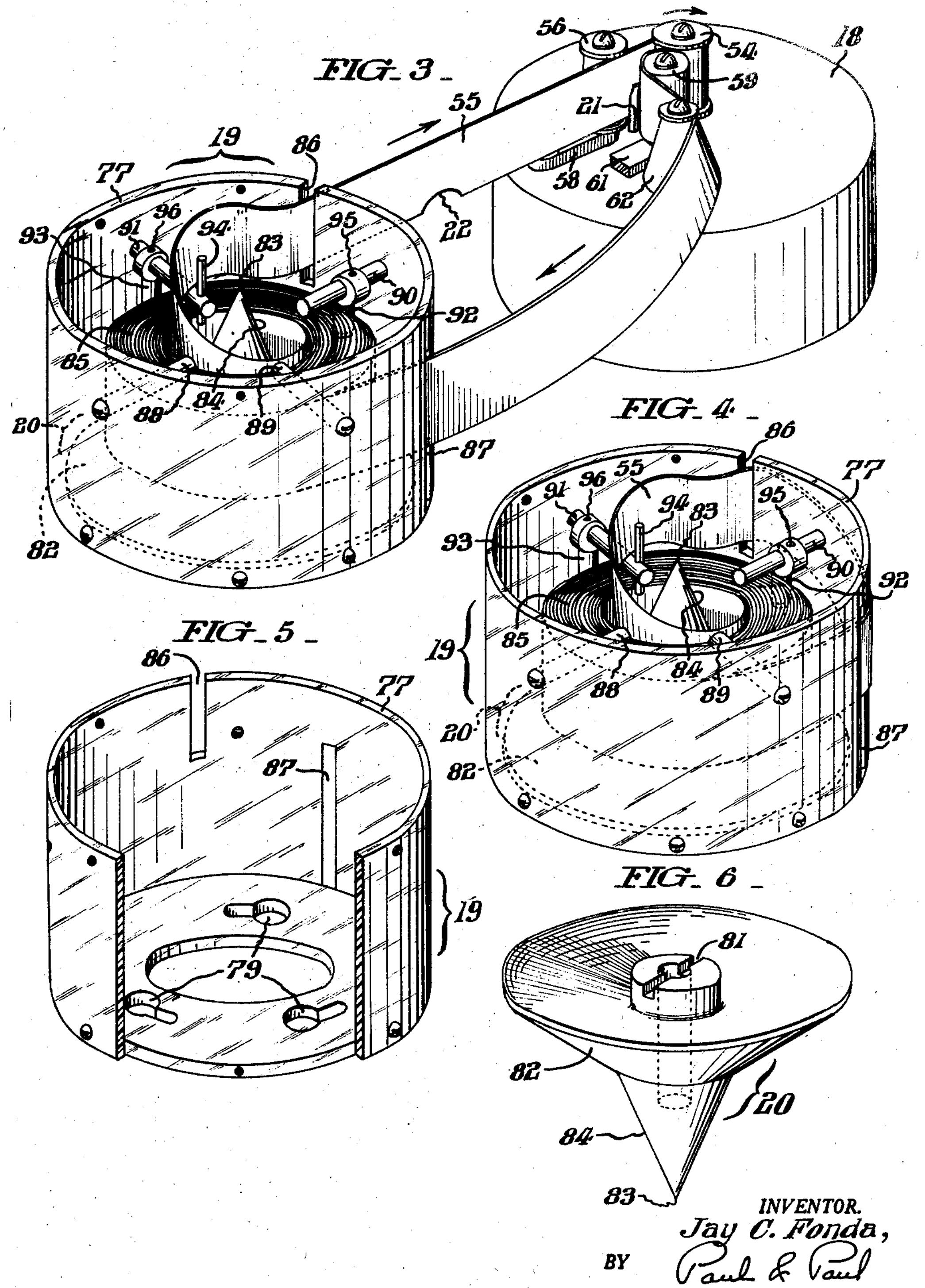
Fig. 3 is a perspective view with some parts eliminated to better illustrate the tape storing and delivering means of the tape recorder of Fig. 1.
Fig. 4 is a perspective view of the tape magazine of Fig. 1 with the tape in storage position.
Fig. 5 is a perspective view of the housing of the tape magazine of Fig. 4 with some parts removed.
Fig. 6 is an inverted perspective view of the tape turntable of the tape recorder of Fig. 1.

The tape magazine 19 may also be used to store tape roll 85 as is shown in Fig. 4. When tape 55 is released from capstan 54 the magazine 19 is removed from platform 18 by rotating it to release bolts 78 from slots 79. The turntable 20 is then rotated manually by turning knob 98 to draw the tape in against the housing 77 as shown in Fig. 4.

The operative relation between capstan 54 and magazine 19 is of considerable importance in the invention. Both capstan 54 and turntable 20 are driven from flywheel 35: the capstan 54 directly through shaft 36 and turntable 20 through drive-belt 38. It has been found that satisfactory results are obtained by maintaining the turntable 20 at about twice the rotational speed of the capstan 54. As has been pointed out, the tape 55 is driven solely by turntable 20. Capstan 54 serves only to meter the delivery of tape 55 past the playing heads. The speed of the tape 55 past the playing heads may be fixed at any desired rate suitable for recording or reproducing. The magazine 19 serves the important function of delivering the tape 55 to the capstan 54 with no tension on it and returning it from the capstan 54 with no tension. Any variations in tension or speed of the tape 55 are absorbed in the freely rotating tape roll 85 as it slides on turntable face 82. It has been found that the tape roll 85 always is self-correcting when the turntable occasionally delivers tape 55 through exit slot 86 at a faster rate than capstan 54 takes it up.

A two speed motor may be used as the motor 30 to provide different recording and reproducing rates. Thus if a motor 30 is used having shaft speeds of 1800 r.p.m. and 900 r.p.m. with a 15:1 reduction ratio from worm 32 to pinion 33 and a four inch circumference capstan 54, linear speeds of 8 inches per second and 4 inches per second of tape 55 respectively may be obtained with corresponding playing times of four hours and eight hours with a 240 foot tape. The reduction ratio may be varied to produce correspondingly different linear speeds and playing times. The high speed can be used to move the tape 55 quickly to any desired place.

It will be apparent from the foregoing description that the term "playing heads" has been used throughout to mean recording, erasing and reproducing heads with similar use of the term "playing," and it is thus that these terms are to be understood.

While the specific embodiment of the invention which has been described in this specification related to magnetic tape recorders, it will be apparent that the invention may be applied to other types of records, such as embossing recorders, and other similar apparatus in which the parts perform similar functions. Likewise, while the invention is directed to the development of a recorder for use with thin, wide tape, it applies to other types of tape as well. It will also be understood that equivalent means may be used for many elements of the invention as described without departing from the spirit of the invention as defined by the following claims.

Having thus described my invention, I claim:

1. A tape recorder comprising recording means, an endless tape, a tape storage and delivery magazine for continuously delivering said tape to said recording means for recording thereon, said recording means being disposed apart from and outside of said magazine, moving means for moving said recording means to each of several successive widthwise tracks on said tape at determined intervals and actuating means integral with said tape for actuating said moving means at said determined intervals.

2. The tape recorder of claim 1 wherein said recording means comprises a magnetically sensitive recording head.

3. The tape recorder of claim 1 wherein said moving means comprises a threaded rod upon which said recording means is threadably mounted, a ratchet disposed on said rod and a solenoid-actuated pawl operatively connected to said ratchet for rotating said rod at said determined interval and thereby moving said recording means.

4. The tape recorder of claim 1 wherein said actuating means comprises a switch, yieldable means urging said switch against one edge of said tape and a recessed portion in said tape adapted to close said switch at said predetermined intervals.

5. A tape recorder comprising magnetic tape actuated magnetically sensitive means, tape delivery means for continuously delivering a magnetic tape to said magnetically sensitive means, driving means for driving said delivery means, time-indicating means actuated by said driving means for indicating the amount of elapsed time which said delivery means has been driven, moving means for moving said magnetically sensitive means to successive tracks on a magnetic tape, actuating means for actuating said moving means at determined intervals, track-indicating means actuated by said actuating means for indicating the track on a magnetic tape which is aligned with said magnetically sensitive means, shut-off means responsive to said magnetically sensitive means for stopping said driving means when said magnetically sensitive means is aligned with a predetermined track on a magnetic tape.

6. The tape recorder of claim 5 wherein said magnetically sensitive means comprises an erasing head, a recording head and a reproducing head and said moving means comprises a pair of spaced, substantially parallel threaded rods, one of said rods threadably connected to said erasing and recording heads and the other threadably connected to said reproducing head, two ratchets operatively connected to said rods respectively, two pawls operatively connected to said ratchets respectively and pawl actuating means for actuating said pawls and thereby moving said heads on said rods at said predetermined intervals.

7. A tape recorder comprising a playing and recording platform, a capstan mounted on said platform, an idler roller adjacent said capstan and substantially in rolling contact therewith, flanges on said capstan covering at least a portion of each end of said idler roller, a threaded rod rotatably mounted on said platform, a second platform movably mounted on said rod, an erasing head and a recording head mounted on said platform, yieldable means urging said heads toward said capstan, detent means for withdrawing said heads from said capstan, a reproducing head mounted on said platform, yieldable means urging said head toward said capstan, detent means for withdrawing said head from said capstan, solenoid-actuated ratchet and pawl means operatively connected to said rod to rotate said rod a predetermined amount at predetermined intervals, a limit switch adapted to stop said recorder and switch actuating means on said second platform for actuating said switch when said record platform has moved a predetermined distance on said rod.

8. A tape recorder comprising a capstan about which a magnetic tape is delivered, a first platform spaced from said capstan, an erasing head and a recording head movably mounted on said first platform, yieldable means urging said heads into operative proximity to said capstan, a second platform spaced from said capstan, a reproducing head movably mounted on said second platform, yieldable means urging said head into operative proximity to said capstan and detent means for selectively withdrawing all of the heads, the erasing and recording heads, or the reproducing head from said capstan.

9. The tape recorder of claim 8 wherein the detent means comprises a rotatable rod vertically mounted between the recording head and reproducing head, a pin transversely mounted on said rod, a template extending from said recording head having recesses therein, said pin being adapted to move along said template in and out of said recesses and against said reproducing head and opposed projections on said erasing and recording heads adapted to withdraw said erasing head upon withdrawal of said recording head by said pin.

10. The tape recorder of claim 1 further comprising separate recording and reproducing means for simultaneously recording and reproducing on different tracks of a magnetic tape.

11. A tape recorder comprising a magnetic head, roller means adjacent said magnetic head for delivering tape thereto at a substantially fixed predetermined rate and separate combined tape storing and feeding means apart from said roller and magnetic head for continuously positively delivering tape substantially free of running tension to said roller means.

12. A tape recorder comprising a magnetic head, a tape magazine spaced from said magnetic head, an endless roll of magnetic tape transversely disposed in said magazine having a loop thereof extending outside said magazine and operatively engaging said magnetic head and means for delivering said tape substantially free of running tension to said magnetic head from the inner portion of said roll.

13. A tape recorder comprising a magnetic head, a tape magazine adapted to deliver magnetic tape continuously to said magnetic head, means for moving said magnetic head widthwise across said tape at predetermined intervals, an endless roll of magnetic tape disposed on its side in said magazine, means in said magazine for sloping said roll of tape upward toward the center thereof and conical means having a high slope relative to the slope of said first mentioned sloping means for continuously lifting said tape out of said roll in a substantially vertical position and for delivering said tape from said roll substantially at the center thereof.

14. A tape delivering magazine comprising a cylindrical shell, a turntable rotatably mounted in said shell, the outer portion of said turntable tapering upwardly toward the center thereof and having a conical center portion having a substantially greater taper than said outer portion and means for rotating said turntable.

15. In a tape recorder, a tape magazine comprising a circular turntable mounted in said housing, first sloping means on said turntable for maintaining a roll of magnetic tape sloping upwardly toward the center thereof, second sloping means disposed inward of said first sloping means on said turntable and having substantially higher slope than said first sloping means, and roller means for maintaining said roll of tape in a substantially round shape during operating of said magazine.

16. In a tape recorder, means for storing a roll of magnetic tape in a horizontal position and continuously delivering said tape to a magnetic head comprising a circular turntable sloping upwardly from its periphery toward the center thereof and having a conical center portion of substantially greater slope than the remainder of said turntable, fixed retaining means for holding the roll of tape in its transverse position and vertical guide means for guiding said roll of tape as it rotates on said turntable.

17. A turntable for continuously delivering tape from an endless coil comprising a rotatable disc having a first surface sloping upwardly and inwardly from the periphery thereof to a predetermined point and a second surface sloping upwardly and inwardly from said predetermined point at a substantially higher slope than said first mentioned surface, the said surfaces forming an angle at said predetermined point.

18. A tape recorder comprising playing means, tape storing and delivery means, means for selectively operating said playing means at different predetermined widthwise tracks on said tape and automatic means for continuously indicating the elapsed time during which said record has operated and the track on said tape which is being played, said tape storing and delivery means comprising a turntable having an outer surface of predetermined slope and an inner surface of substantially greater slope.

References Cited in the file of this patent

UNITED STATES PATENTS

| | | |
|---|---|---|
| 1,031,129 | Lloyd | July 2, 1912 |
| 2,032,190 | Thomas | Feb. 25, 1936 |
| 2,039,108 | Owens | Apr. 28, 1936 |
| 2,167,817 | Smith | Aug. 1, 1939 |
| 2,275,961 | Heller | Mar. 10, 1942 |
| 2,513,423 | Owens | July 4, 1950 |
| 2,648,589 | Hickman | Aug. 11, 1953 |
| 2,679,551 | Newby | May 25, 1954 |
| 2,680,025 | Goodwin | June 1, 1954 |
| 2,699,332 | Mackenzie | Jan. 11, 1955 |

FOREIGN PATENTS

| | | |
|---|---|---|
| 523,526 | Belgium | Apr. 15, 1954 |

UNITED STATES PATENT OFFICE

CERTIFICATE OF CORRECTION tent No. 2,908,769 October 13, 1959

Jay C. Fonda

It is hereby certified that error appears in the printed specification the above numbered patent requiring correction and that the said Letters tent should read as corrected below.

Column 7, line 63, before "playing" insert -- first --; line 64, efore "platform", second occurrence, insert -- first --; line 68, before platform" insert -- first --; line 70, before "platform" insert -- second --; ine 73, before "platform" insert -- second --; column 8, line 6, for record" read -- second --; line 75, for "operating" read -- operation --; olumn 10, line 2, for "record" read -- recorder --.

Signed and sealed this 22nd day of March 1960.

(SEAL)
ttest:

KARL H. AXLINE
ttesting Officer

ROBERT C. WATSON
Commissioner of Patents